Oct. 25, 1955  R. M. HARPER  2,721,322
DESIGN OF SHIELDING DEVICE FOR EYES
OF LANDING SIGNAL OFFICER
Filed June 15, 1953

INVENTOR.
RALPH M. HARPER
BY
H. H. Gearinger
ATTORNEYS

United States Patent Office 2,721,322
Patented Oct. 25, 1955

2,721,322

DESIGN OF SHIELDING DEVICE FOR EYES OF LANDING SIGNAL OFFICER

Ralph M. Harper, Philadelphia, Pa., assignor to the United States of America as represented by the Secretary of the Navy Application June 15, 1953, Serial No. 361,886

2 Claims. (Cl. 2—12)

(Granted under Title 35, U. S. Code (1952), sec. 266)

The invention described herein may be manufactured by or for the Government of the United States of America for governmental purposes without the payment of any royalties thereon or therefor.

The present invention relates to an eye shielding device and more particularly to a novel and improved eye shielding device which is specially designed for the use of a landing signal officer during night landing operations on an aircraft carrier or the like.

In landing various types of aircraft within the limited confines of the flight deck of the carrier or the like the visual signals which the landing signal officer is able to provide the pilot of the incoming aircraft are generally considered indispensible to the safety of the landing operation. Accordingly, these signals are highly desirable during landing operations which take place at night as well as those which are carried out in the daytime. In order to make his signals more readily visible and distinguishable at night, it is generally customary to provide an ultra violet lighting source or system which is adapted to illuminate predetermined phosphorescent areas of the officer's clothing and his signalling paddles. Although his signals are generally made readily visible to the pilot of the incoming aircraft in this way, the light from the ultra violet source as well as that which is reflected from the officer's clothing and his paddles materially obstructs the officer's vision and is at the same time ordinarily harmful to his eyes.

It is a principal object of the present invention to provide a novel and improved eye shielding device which is particularly designed for the use of a landing signal officer during night landing operations on an aircraft carrier or the like.

It is a further object of the present inventon to provide a novel and improved eye shielding device for a landing signal officer on an aircraft carrier, which device is light in weight, flexible in construction, and effective in use.

Other objects and many of the attendant advantages of this invention will be readily appreciated as the same becomes better understood by reference to the following detailed description when considered in connection with the accompanying drawings wherein.

In general the improved eye shielding device of the present invention includes a flexible grid-like frame member having a scoop-shaped contour, a fabric covering which is secured to and extends about the periphery of the frame member, and means for positioning the frame member on an upper portion of the wearer's body such that it obstructs the wearer's downward line of vision. It has been found that such a device provides a particularly useful eye shield for the above described purposes.

Figure 1:
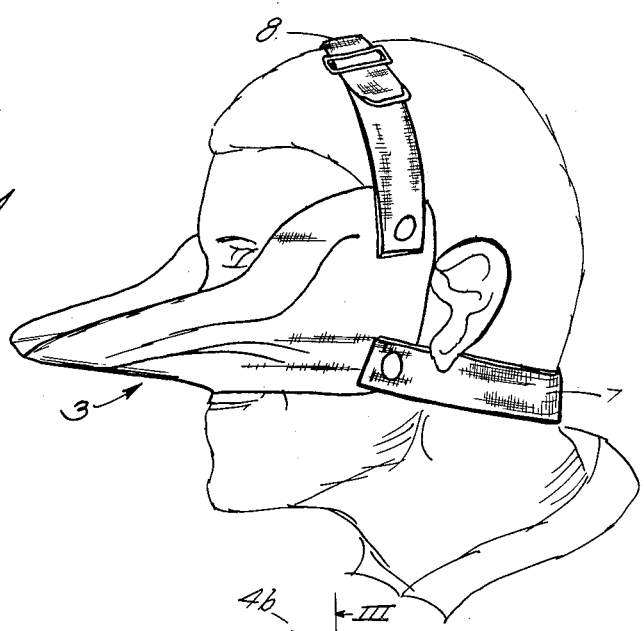
Figure 1 is a perspective view of a preferred embodiment of the present invention showing in particular the manner in which it is preferably worn.
Figure 2:
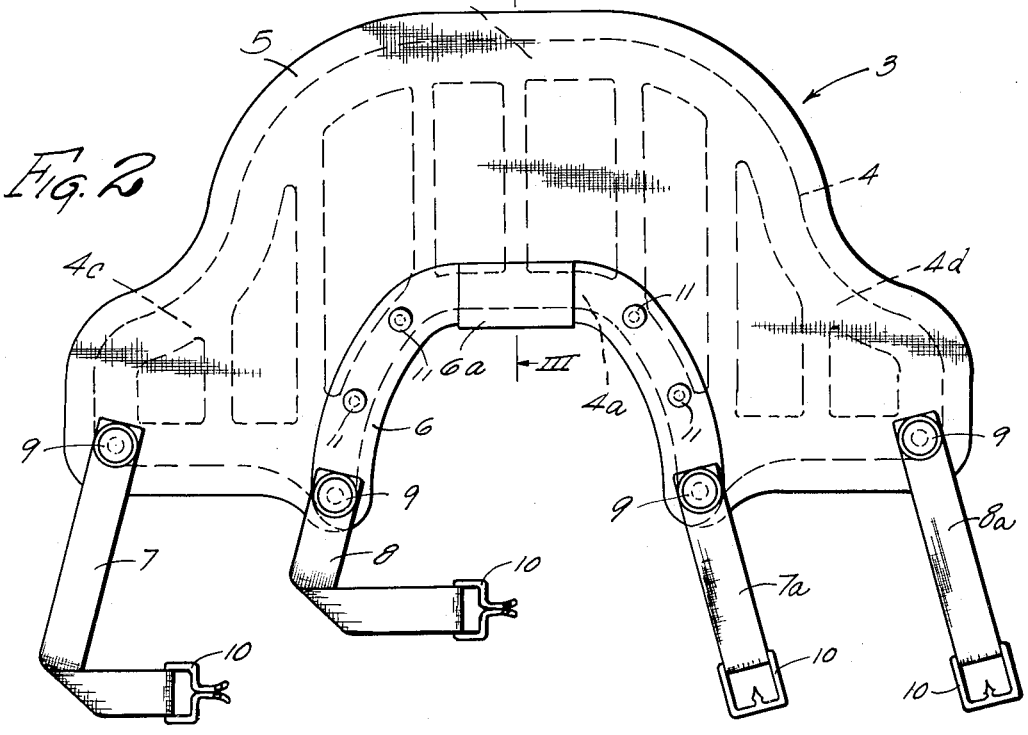
Figure 2 is a developed plan view of the embodiment of the invention shown in Figure 1.
Figure 3:
Figure 3 is a section along reference line III—III in Figure 2.

A preferred embodiment of the present invention is shown in detail in Figures 1-3 of the drawing. As shown therein the improved eye shielding device which is generally designated by the reference numeral 3 includes the relatively thin sheet metallic frame or grid-like member 4, the fabric covering or the like 5, the protective padding element 6, and the positioning straps 7 and 7a and 8 and 8a. As will be more apparent hereinafter, the metallic grid-like member or the like 4 is a particularly important feature of the present invention in that it stiffens the eye shielding device so as to render it effective in use and yet at the same time make it sufficiently flexible to prevent injury to the wearer when it becomes necessary on occasion to drive into a nearby safety net.

As best shown in Figure 2 of the drawing, the general contour of the grid like member 4 resembles that of a scoop or shovel and includes the centrally located semicircular concave edge portion 4a, the convex substantially concentric opposed edge portion or brim 4b, and the lateral ear like extremities 4c and 4d. The lateral extremities 4c and 4d which are preferably directed upwardly as shown in the drawing at substantially right angles to the plane of the central portion of the grid member 4 are adapted to bear against opposite temples of the wearer whereas the concave portion 4a thereof fits snugly over his face preferably immediately above his upper lip such that the convex brim 4b extends outwardly therefrom to form a suitable eye shielding visor-like element.

The fabric covering or the like 5 which is suitably secured to and extends about the inner and outer surfaces of the grid-like member 4 renders the same opaque to light. In this way as is readily apparent when the eye shield is properly worn the fabric covered member 4 thereby effectively shields the wearer's eyes from light sources and/or the reflections thereof which are directed upwardly from the flight deck of the carrier. Although as indicated heretofore material out of which the covering or the like 5 is constructed is preferably a suitable type of fabric or the like, it is to be understood that any other kind of material such as rubber leather or a flexible plastic material or the like could be used without departing from the spirit or scope of the present invention.

The straps 7 and 7a and 8 and 8a which are also constructed from any suitable type of material are preferably arranged to respectively extend rearwardly about the wearer's neck and upwardly over his head. In this way they are adapted to effectively support and maintain the eye shield in its proper position during its use. The button type snap fasteners or the like 9 permit the various extremities of the straps to be detachably secured to the lateral extremities 4c and 4d of the grid-like member 4 whereas the conventional buckles or the like 10 which are associated with the strap permit a secure fit of the eye shield to the wearer's face and head.

The protective padding element or the like 6 and 6a are preferably secured as shown in the drawing to the concave edge portion 4a of the improved eye shield by means of the rivet members or the like 11. In this way the irritating abrasive action of the shield against the wearer's face is materially reduced and/or eliminated.

It is to be noted that the above described device provides an efficient eye shield which is worn comfortably, and which does not restrict or impair either visual depth or sound perception. It is also to be noted that the above described device provides a useful eye shield which is light in weight, stiff enough to withstand a relatively strong breeze and yet sufficiently flexible to prevent injury to the wearer when on occasion it becomes necessary to drive into a nearby safety net.

Although the above described eye shielding device has been particularly devised for the use of a landing signal officer during a night landing operation on an aircraft carrier, it is to be understood that the same could be used for any other suitable purpose without departing from the spirit or scope of the present invention.

Obviously many modifications and variations of the present invention are possible in the light of the above teachings. It is therefore to be understood that within the scope of the appended claims the invention may be practiced otherwise than as specifically described.

What is claimed is:

1. An eye shielding device for a landing signal officer comprising a thin metallic grid-like frame, the contour of the frame resembling the shape of a scoop and including a centrally located concave edge portion, a convex brim portion and a pair of upwardly directed lateral extremities; a fabric covering which is secured to and extends about the entire periphery of the frame; and means including a pair of strap members attached to the frame for securely positioning the device upon the person of the officer, the frame and the strap members being so arranged and constructed that when the strap members are respectively secured about the neck and over the head of the officer the brim portion of the frame extends outwardly from the officer's upper lip and the upwardly directed lateral extremities of the frame bear against his temples.

2. An eye shielding device for a landing signal officer comprising a thin metallic grid-like frame, the contour of the frame resembling the shape of a scoop and including a centrally located concave edge portion, a convex brim portion and a pair of upwardly directed lateral extremities; a fabric covering which is secured to and extends about the entire periphery of the frame; a protective padding element which is secured to the said concave portion of the fabric covered frame; and means including a pair of strap members attached to the frame for securely positioning the device upon the person of the officer, the frame and the strap members being so arranged and constructed that when the strap members are respectively secured about the neck and over the head of the officer the brim portion of the frame extends outwardly from the officer's upper lip and the upwardly directed lateral extremities of the frame bear against his temples.

References Cited in the file of this patent

UNITED STATES PATENTS

| Number | Name | Date |
|---|---|---|
| 971,503 | Howard | Sept. 27, 1910 |
| 1,152,431 | Mullen | Sept. 7, 1915 |
| 2,435,100 | Rasmussen | Jan. 27, 1948 |
| 2,545,078 | Gardner | Mar. 13, 1951 |